United States Patent [19]

Raff

[11] 3,882,075
[45] May 6, 1975

[54] PREPARATION OF POLYMERS CONTAINING ADDITIVES BY INTERFACIAL POLYCONDENSATION

[75] Inventor: Rudolf August Victor Raff, Pullman, Wash.

[73] Assignee: Research Corporation, New York, N.Y.

[22] Filed: Mar. 24, 1972

[21] Appl. No.: 237,878

[52] U.S. Cl. ............... 260/37 N; 260/41 A; 264/78; 264/211
[51] Int. Cl. ... C08g 69/04; C08g 63/18; C08g 18/08
[58] Field of Search .............. 260/37 N, 41, 40, 78; 264/184, 187, 180, 211, 78

[56] References Cited
UNITED STATES PATENTS

| | | | |
|---|---|---|---|
| 2,708,617 | 4/1953 | Magat | 18/54 |
| 2,993,018 | 7/1961 | Steinlin | 260/17.4 |
| 3,401,142 | 9/1968 | Bowman | 260/40 |
| 3,708,456 | 1/1973 | Kardos | 260/37 N |

FOREIGN PATENTS OR APPLICATIONS 1,152,244   1969   United Kingdom

*Primary Examiner*—Morris Liebman
*Assistant Examiner*—Richard Zaitlen
*Attorney, Agent, or Firm*—Dennis P. Clarke; Harold L. Stowell

[57] ABSTRACT

An additive is incorporated in a polymer by forming it in situ with the polymer by interfacial polycondensation.

12 Claims, No Drawings

PREPARATION OF POLYMERS CONTAINING ADDITIVES BY INTERFACIAL POLYCONDENSATION

BACKGROUND OF THE INVENTION

The incorporation of additives in polymer formulations to impart various properties to the polymers is, of course, well known. These additives may comprise fillers for reinforcing or increasing the strength of the polymer, flame retardants, lubricants, plasticizers, light and heat stabilizers, etc.

Various methods have been proposed for incorporating these additives in polymers. The single most important requisite in all of the methods heretofore advanced is the necessity for achieving uniform dispersion of the additive in the polymer. In the absence of uniform dispersion the composition will not exhibit constant properties throughout the formulation. Generally, these methods comprise physical blending or mixing techniques wherein heat is utilized to facilitate blending. Very often it is necessary to melt or soften the polymer in order to obtain an intimate admixture thereof with the additive.

In many instances, however, melting or softening of the polymer leads to deterioration of the polymer. For example, many polyamides, polyurethanes, polyesters, polycarbonates, and other condensation polymers decompose, isomerize or cross-link at temperatures below their melting or softening points. In order to achieve uniform distribution of additives in these types of polymers various complex and expensive techniques have been devised. All of these methods share the disadvantages (1) that they are inefficient, time-consuming and require expensive and elaborate incorporation means, and (2) that they are seldom able to achieve the degree of uniformity of dispersion often required in order to ensure a uniform and consistent product.

The method of the present invention enables the uniform incorporation of additives in heat-sensitive condensation polymers.

SUMMARY OF THE INVENTION

The invention is an improvement in the method of forming a polymer by condensation at the interface of plural immiscible solvent solutions, each containing at least one monomer requisite for forming the polymer.

The improvement comprises uniformly incorporating a compatible additive in the polymer by providing the reactants necessary to form the additive under the polymerization conditions separately in the monomer solutions. The additive is formed simultaneously with and uniformly dispersed in the polymer at the interface.

DESCRIPTION OF THE INVENTION

By forming the desired additive in situ with the polymer by conventional interfacial condensation techniques, there is no need for physical admixing of the additive with the polymer utilizing heat and, hence, no destruction or deterioration of the polymer. Moreover, since the additive is formed in situ it is much more intimately and uniformly blended with the polymer than in the prior art physical mixing processes. Also, the process of the invention is more economical than the conventional procedures for incorporating additives in plastics, in that the customary separate mixing and blending steps are eliminated.

The process is applicable to any condensation polymer capable of being formed by interfacial condensation, e.g., polyamides, polyesters, polyurethanes, polysulphonamides, polyphosponamides, polyanhydrides, polyamines, polyethers, polysulfides, etc. Interfacial polycondensation enables the formation of polymers under very mild reaction conditions thereby avoiding the elevated temperatures required for polymerization in the melt or in solution which so often lead to deterioration of the polymer.

The condensation reaction best satisfying the requirements of mild reaction conditions and a fast reaction rate essential for interfacial polycondensation is the Schotten-Baumann reaction of a dibasic acid halide with a difunctional co-reactant containing at least two active hydrogen atoms. Exemplary of the dibasic acid halides are dicarboxylic acid chlorides, e.g., succinyl, adipyl, sebacyl, phthaloyl, terephthaloyl, bibenzoyl, and fumaryl acid chlorides; di-sulfonyl chlorides, e.g., 1,2-ethanedisulfonyl, benzenedisulfonyl, 4,4'-biphenyldisulfonyl, 2,7-naphthalenedisulfonyl chlorides; bis-chloroformates, e.g., ethylene, trimethylene, 1,4-cyclohexylene and p-phenylene bischloroformates.

Exemplary of the active hydrogen containing co-reactants are diamines, e.g., ethylene, hexamethylene diamines, hydrazine, piperazine, benzidines; polyols, e.g., ethylene, propylene glycols, 1,4-butane, 1-5, pentane diols, hydroquinone; polythiols, e.g., ethylene, tetramethylene, pentamethylene, hexamethylene and decamethylene dithiols.

In interfacial polycondensation the polymerization reaction occurs at or near the interface between plural immiscible solvent solutions, each containing a monomer solute. Usually, the interface is formed between an aqueous solution of the active hydrogen containing monomer and an organic solvent solution of the acid halide. Generally, the reaction occurs just within the organic solvent layer. In order to neutralize the hydrogen halide liberated during the reaction which migrates to the aqueous phase, an alkaline reagent may be included in the aqueous solution.

The reaction rate of the co-reacting monomers is so rapid that the polymerization reaction becomes diffusion controlled, i.e., incoming monomer units react so rapidly with polymer-chain end groups that they are unable to penetrate or diffuse through the polymer layer. Accordingly, the monomers are incapable of reacting with each other to form new polymer chains. As a result, polymers with much higher molecular weights are formed than in a normal polymerization system.

Generally, any system of solvents which are mutually immiscible, non-solvents for the polymer formed and each capable of dissolving one of the monomers and not the other, is suitable for interfacial polycondensation reactions. For purposes of convenience, efficiency and cost, however, water is generally employed as a solvent for the active hydrogen containing monomer and a non-polar water-immiscible organic solvent such as $CCl_4$, benzene, n-hexane, n-octane, xylene, chlorobenzene, toluene, benzene, dichloromethane, ethyl ether, etc., is generally employed for the diacid halide. It is to be understood, however, that other polar solvents may be substituted for water such as ethylene, propylene glycols, cyclohexanone, 1,2-propylene oxide, tetrahydrofurane, tetramethylene sulfone, etc.

The polymerization reaction proceeds generally at or near ambient temperatures. In certain isolated cases it may be necessary to slightly warm the system in order to achieve a reasonably rapid reaction rate.

If the complementary phases, each containing the requisite monomer, are brought together without agitation, a thin film of polymer forms at the interface. The polymer may be allowed to continue to build up as a film or it may be drawn off the interface as a continuous filament. The complementary phases may be agitated in the absence or presence of surfactants to form particulate polymers having a wide range of shapes and sizes.

According to the present invention additives such as fillers, dyes, flame-retardants, etc., are formed in situ and uniformly dispersed in the polymer as it is formed by including the co-reactants necessary to produce the additive under the polymerization conditions separately in the monomer solutions. As the polymer is formed the additive is simultaneously formed by a reaction at the interface of the phases and is uniformly blended or dispersed in the polymer as it is formed.

Virtually any additive capable of formation by the reaction of co-reactants soluble or dispersible in the respective complementary phases of the interfacial polycondensation system may be incorporated into the polymer by the method of the present invention. Generally, any filler comprising a water insoluble salt precipitable from its water-soluble ionic components may be formed in the polymer. These include fillers such as metal silicates (Al, Ca, Mg), metal sulfates (Ca, Ba), metal phosphates (Ca, Ba, Mg, Zn), metal halides (AgCl, AgBr), etc.

Included among the additives are dyes such as colored lakes formed by the reaction of a lake former, and a metallic salt. Suitable dyes include the anthraquinones containing ortho-paired hydroxy groups, e.g., alizarin, naphthazarin, quinalizarin, etc. and the so-called acid dyes, e.g., Alizarine Blue SAP (1,5-dihydroxy-4,8-diamino-2,6-anthraquinonedisulfonic acid) and Alizarine SAE which is the corresponding monosulfonic acid. Suitable metallic salts include those of aluminum, chromium, iron, calcium, barium, and other multi-valent metals.

Flame retardants may also be incorporated in the condensation polymers by the method of the invention. Such retardants include the metal salts of 1,4,5,6,7,7-hexachlorobicyclo[2.2.1] hept-5-ene-2,3-dicarboxylic anhydride, chlorendic anhydride, tetrabromophthalic acid, tetrachlorophthalic acid, pentachloro-phenol, etc.

The method of the invention may also be employed to incorporate silica gel in condensation type polymers. Thus, by including a metal silicate and an acid in the respective monomer solutions the reaction at the interface will comprise the formation of silica which is immediately dispersed in the polymer.

EXAMPLE 1

Sebacyl chloride (3.0 ml, 0.0129 mole) and 0.5 g of alizarin (1,2-dihydroxyanthraquinone) was added to 65 ml of carbon tetrachloride ($CCl_4$) contained in a 250 ml beaker. A solution of hexamethylenediamine (HMDA) (10.0 ml) and 1.0 g of barium hydroxide in 50 ml water was then introduced carefully into the beaker containing the acid chloride solution. The uniformly colored blue polymer film forming immediately on the interface was grasped with a tweezer, pulled off the interface in a twisting motion and the resultant rope rolled onto a glass rod, and the glass rod rotated horizontally until the solution had become exhausted and polymer no longer formed on the interface.

The fibrous polymer was broken up in ethyl alcohol, filtered, then washed with $CCl_4$, followed by another alcohol wash, then washed with water, and allowed to dry at room conditions.

EXAMPLE 2

A solution of 1.0 g of barium hydroxide and HMDA (5.0 g, 0.043 mole) in 70 ml water was placed in a Waring Blender, set on 80 of a scale of 130. Over a period of 10 seconds, a solution of sebacyl chloride (2.0 ml, 0.0086 mole) and 0.5 g of alizarine in 50 ml of $CCl_4$ was added while stirring. After about 3 minutes of stirring, the blue colored polymer was collected by filtration, and washed and dried as described in Example 1.

EXAMPLE 3

Barium sulfate filler was incorporated in a polyamide by the following procedure.

A solution of 2.2 g of HMDA and 0.75 g of $Ba(OH)_2$ in 50 ml of water was layered upon a solution of 2.0 ml of sebacyl chloride and 10 ml of $H_2SO_4$ in 50 ml of $CCl_4$. The barium sulfate filled polyamide film was recovered and washed as in Example 1. The polyamide was found to contain 7% barium which corresponds to a $BaSO_4$ content of 12%.

The following two examples exemplify the incorporation of flame retardants in polymers.

EXAMPLE 4

A solution of 0.8 g of $ZnCl_2$ and 2.2 g of HMDA in 50 ml of water was layered on a solution of 3.0 ml of sebacyl chloride and 5.0 ml of concentrated phosphoric acid in 50 ml of $CCl_4$. The polymer was collected and washed as in Example 1 and found to contain 4% Zn (corresponding to 8% zinc phosphate flame retardant) uniformly distributed therein.

EXAMPLE 5

A solution of 10 g of HMDA and 0.7 g of $ZnCl_2$ in 50 ml of water was layered on a solution of 3.0 ml of sebacyl chloride and 1.5 g of pentachlorophenol in 50 ml of $CCl_4$.

The polymer was recovered from the system as in Example 1, extracted with hexane and dried. It was found to contain 3% Zn (which corresponded to 29% of zinc pentachlorophenate) uniformly distributed therein.

EXAMPLE 6

A solution of 3.0 g of HMDA and 0.8 g of $AgNO_3$ in 75 ml of water was placed in a Waring blender run at medium speed. Over a period of 15 seconds, a solution of 3.0 ml of sebacyl chloride and 5.0 ml of ethylene bromide in 50 ml of $CCl_4$ was added. After stirring for 3 minutes, the polymer was collected by filtration, washed and dried as in Example 1. Originally white, the polymer, containing 3% Ag in the form of uniformly distributed light sensitive silver bromide, turned dark on exposure to light.

EXAMPLE 7

A solution of 4.0 ml of ethylene-bis-(chloroformate) and 1.0 g of pentachlorophenol in 60 ml of benzene cooled to 10°C. was layered on a solution of 15 ml of HMDA, 5 g of $Na_2CO_3$ and 1.5 g of $ZnCl_2$ in 75 ml of water cooled to 5°C.

The resultant polyurethane film was removed continuously from the interface as described in Example 1, washed with ethanol, water and ethanol again and dried. The polyurethane film was found to contain 2.5% Zn (corresponding to 26% zinc pentachlorophenate).

EXAMPLE 8

A solution cooled to 5°C. of 15 ml HMDA, 0.6 g of aluminum sulfate, 5.0 g of $Na_2CO_3$ and 0.75 g of Duponol ME (sodium lauryl sulfonate-DuPont) in 75 ml and a solution cooled to 10°C, of 5.0 ml of ethylene-bis-(chloroformate) and 1.0 g of alizarin in 60 ml of benzene were mixed in a Waring blender at medium speed for 5 minutes. The red colored polymer was isolated by filtration, purified by consecutive washings with ethanol, water and ethanol and dried.

I claim:

1. In a method of forming a polymer by condensation at the interface of plural immiscible solvent solutions, each containing at least one monomer requisite for forming the polymer, the improvement comprising uniformly incorporating a compatible additive in said polymer by providing the reactants necessary to form the additive under the polymerization conditions separately in the monomer solutions whereby the additive is formed in situ with and uniformly dispersed in the polymer at the interface.

2. The method of claim 1 wherein the monomers comprise a diacid halide and an active hydrogen containing compound and are capable of undergoing the Schotten-Baumann condensation.

3. The method of claim 2 wherein the acid halide is selected from the group consisting of di-carboxylic acid halides, di-sulfonyl halides and bis-haloformates.

4. The method of claim 2 wherein the active hydrogen containing compound is selected from the group consisting of diamines, polyols and dithiols.

5. The method of claim 2 wherein the acid halide is a dicarboxylic acid chloride, the active hydrogen containing compound is a diamine and the polymer is a polyamide.

6. The method of claim 2 wherein the acid halide is a dicarboxylic acid chloride, the active hydrogen containing compound is a dihydroxy alcohol and the polymer is a polyester.

7. The method of claim 2 wherein the acid halide is a bis-chloroformate, the active hydrogen containing compound is a diamine and the polymer is a polyurethane.

8. The method of claim 1 wherein one of the reactants is a lake former, the other reactant is a metal salt and the additive thus formed is a colored lake.

9. The method of claim 8 wherein the lake former is 1,2-dihydroxyanthraquinone, the metal salt is a barium salt and the thus formed additive is an alizarin dyestuff.

10. The method of claim 1 wherein one of the reactants is an inorganic anion, the other reactant is an inorganic cation and the thus formed additive is an insoluble salt.

11. The method of claim 1 wherein one of the reactants is a metallic salt, the other reactant is a precipitant of the free metal and the thus formed additive is a metal.

12. The method of claim 1 wherein one of said reactants is a silicate, the other reactant is an acid and the thus formed additive is silica.

* * * * *